United States Patent Office 3,303,220
Patented Feb. 7, 1967

3,303,220
TRIPHENYLPHOSPHONIUM METHYLENE TRIPHENYLPHOSPHORANE COMPLEX GROUP III METAL HYDRIDES
Clifford N. Matthews, Winchester, and John S. Driscoll, Belmont, Mass., assignors to Monsanto Research Corporation, St. Louis, Mo., a corporation of Delaware
No Drawing. Filed Mar. 4, 1963, Ser. No. 262,372
4 Claims. (Cl. 260—606.5)

This invention relates to a novel method of reduction and to novel reducing agents, and more particularly, provides novel complex hydrides of phosphonium methylene phosphoranes, and methods of reduction employing the stated hydrides.

Sodium borohydride and lithium aluminum hydride are widely used as selective reducing agents. They will reduce functional groups, converting carbonyl to carbinol groups, for example, while leaving carbon-to-carbon double bonds unattacked. However, neither hydride is easy to handle. Sodium borohydride is hygroscopic. Because lithium aluminum hydride is highly reactive in air, as well as being insoluble in most organic solvents, it must be used under anhydrous conditions, and generally as a slurry in organic reaction systems.

It is an object of this invention to provide novel reducing agents and novel methods of reduction.

A particular object is to provide a novel reducing agent soluble in organic solvents, and a method of reduction comprising employing the same as a reducing agent.

These and other objects will become evident from a consideration of the following specification and claims.

In accordance with this invention, there are now provided novel complex hydrides comprising hydrides of phosphonium methylene phosphoranes. These complex hydrides, it has now been found, are soluble in organic solvents and are active reducing agents. Thus, an advantageous method of reduction is provided, comprising employing this novel class of complex hydrides as reducing agents.

In phosphonium methylene phosphorane salts, the cation, such as the triphenyl phosphonium methylene triphenylphosphorane cation, of the formula $$(HC[P(C_6H_5)_3]_2)^\oplus$$

is mesomeric, as shown by the nuclear magnetic resonance spectrum of the ion. It can be written with the structure $$[\phi_3P-\overset{H}{C}=P\phi_3]^\oplus$$

($\phi$=phenyl). In such mesomeric radicals, however, a resonance system is present and the two P atoms are equivalent. Thus the formula of the ion may be written to show the resonance:

Actually the charge is distributed over both P atoms, and more accurately, the charge is shown as distributed, for example, by a formula such as

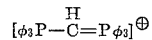

Thus, the hydrides provided hereby are represented by the general formula

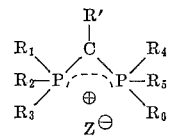

where each R (each of $R_1$, $R_2$, $R_3$ and so forth) is hydrocarbon free of aliphatic (olefinic or acetylenic) unsaturation and containing up to 18 carbon atoms, R' is selected from H and R (that is, hydrocarbon free of aliphatic unsaturation and containing up to 18 carbon atoms), and Z is a complex hydride anion.

By a complex hydride anion is meant a complex hydride anion including a Group III element, such as $BH_4^\ominus$, $AlH_4^\ominus$, and $GaH_4^\ominus$.

The complex hydrides of this invention, it is found, have unusually advantageous properties as reducing agents, particularly for organic reductions. Unlike sodium borohydride, they are not hygroscopic. Unlike lithium aluminum hydride, they are soluble in number of organic solvents. Thus, homogeneous reaction systems for reduction of organic compounds can be prepared with the present complex hydrides. Indeed, an organic solvent solution of a complex hydride as provided hereby can be heated to boiling with the complex hydride remaining undecomposed, it is so stable.

Additionally, the presently provided novel compounds have certain other unusual and valuable properties. The phosphonium methylene phosphorane complex hydrides are photochromic, changing color on exposure to light, and on such exposure, can form free radicals, as indicated by electron paramagnetic resonance spectra.

Thus the present novel compounds can be employed to advantage as reducing agents, in the novel method of this invention, and also for other purposes, such as light exposure indicators (for example, on film packs), and stable sources of free radicals activatable by energetic radiation such as light. Additionally, the presently provided hydrides may be employed for industrial and agricultural applications such as use as wetting agents, as rubber antidegradation agents, as ionic catalysts, and as biological toxicants including insecticides, fungicides, herbicides, nematocides, and so forth.

Referring to the reduction method of this invention, this comprises contacting a chemical compound with a phosphonium methylene phosphorane complex hydride. Especially advantageously, said method comprises effecting reduction of a chemical compound in a homogeneous reaction system by contacting the compound with an organic solvent solution of a phosphonium methylene phosphorane complex hydride.

Employing the novel reduction method of this invention, organic compounds can be reduced selectively, without difficulty due to instability of the reducing agent, and conveniently, in a homogeneous organic reaction system.

Referring now in more detail to the novel complex hydrides of this invention, these are described as phosphonium methylene phosphorane complex hydrides, and the term methylene is used herein in reference to the fact that a single aliphatic carbon atom separates the two phosphorus atoms in these compounds. The substituents of the C and P atoms in the cation may be H or hydrocarbon, which may be an aliphatic (including cycloaliphatic), aromatic or aromatic-aliphatic (alkaryl or aralkyl) radical. P atom substituents which are aromatic or alkaromatic are especially preferred for stability and solubility of the product. The anions in the present compounds will be complex hydride ions such as $BH_4^\ominus$, $AlH_4^\ominus$, and $GaH_4^\ominus$, including a Group III element and hydrogen atoms.

Illustrative of the presently provided complex hydrides are for example, triphenylphosphonium methylene triphenylphosphorane borohydride, triphenylphosphonium methylene triphenylphosphorane aluminum hydride, triphenylphosphonium methylene triphenylphosphorane gallium hydride, tri-p-tolylphosphonium methylene triphenylphosphorane borohydride, tri-p-tolylphosphonium methylene tri-p-tolylphosphorane borohydride, triphenylphosphonium ethylidene triphenylphosphorane borohydride, trimethylphosphonium methylene trimethylphosphorane borohydride, tributylphosphonium methylene tributylphosphorane borohydride, tributylphosphonium methylene tributylphosphorane gallium hydride, tricyclohexylphosphonium methylene tricyclohexylphosphorane borohydride, tribenzylphosphonium methylene tribenzylphosphorane borohydride, triphenylphosphonium propylidene triphenylphosphorane borohydride, triphenylphosphonium propylidene triphenylphosphorane aluminum hydride, triphenylphosphonium benzylidene triphenylphosphorane borohydride, trinaphthylphosphonium methylene trinaphthylphosphorane borohydride, tribiphenylphosphonium methylene tribiphenylylphosphorane borohydride, tris(decylphenyl)phosphonium methylene tris(decylphenyl)phosphorane borohydride and so forth.

A method which may be employed for preparation of presently provided hydrides listed above comprises metathesis of a phosphonium methylene phosphorane salt with a metal complex hydride. As disclosed in a copending application S.N. 154,874, filed November 24, 1961, by Clifford N. Matthews, which is incorporated herein by reference, phosphonium methylene phosphorane salts such as the halides can be prepared readily by treatment of a methylene bis(phosphonium halide) with a base, effecting removal of one mole of hydrogen halide and producing the phosphonium methylene phosphorane halide as product. This is illustrated by the equation

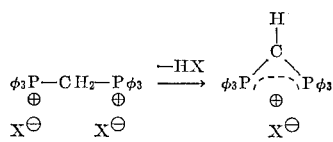

where $\phi$=phenyl and X=halogen. These halides are accordingly readily available and can advantageously be employed to prepare the presently provided complex hydrides such as the borohydrides, by a metathetical exchange.

The complex metal hydrides use to effect such exchange with the phosphonium methylene phosphorane halides will be the complex hydrides of metals such as the alkali, alkaline earth and Group III metals, and the complex hydride ion in the stated salts will be an ion formed by union of hydrogen with an element of Group III of the Periodic Table. Thus, useful hydrides include, for example, lithium borohydride, sodium borohydride, potassium aluminum hydride, lithium aluminum hydride, magnesium borohydride, zinc borohydride, and so forth.

Conditions for effecting the exchange of ions will generally comprise contacting the reactants in solvents or diluents. Organic hydroxylic compounds such as alkyl alcohols like methyl, ethyl or propyl alcohols, for example, provide a suitable solvent; ethers such as dioxane and tetrahydrofuran can also be used. The ratio for the metathetical reaction need not be stoichiometric: one of the reactants can if desired be introduced in excess, such as up to about a 20:1 molar ratio, to produce complete utilization of the other. Heating can be employed if desired, to accelerate the reaction, but generally temperatures above 100° C. are unnecessary, and indeed, simply contacting the reactants at ambient temperatures such as 20–25° C. is usually sufficient, and cooling to temperatures such as 0° C. may be desirable to moderate an exothermic reaction. Pressures may range from sub- to super-atmospheric, although atmospheric pressures are usually suitable.

Isolation of the complex hydrides is effected by means usual in the art, such as filtration, extraction and so forth. The products are generally solid, crystalline, stable products.

The complex hydrides of the invention may be employed as reducing agents, alone or in mixture with other metal salts, in accordance with the present novel method, to effect reduction of any of a wide variety of materials. For example, this may be an inorganic salt, such as silver nitrate or other metal salts. Especially valuably, it may be an organic compound, such as a carbonyl compound. Illustrative of reductions which may be effected by the use of complex hydrides in accordance with this invention are the reduction of a carbonyl group, such as the reduction of an aldehyde to an alcohol, as illustrated by the reduction of cinnamaldehyde to cinnamyl alcohol, of m-nitrobenzaldehyde to m-nitrobenzyl alcohol, of crotonaldehyde to crotyl alcohol and the like. Similarly, the carbonyl group in a ketone may be reduced to a carbinol group, as exemplified by reduction of acetone to isopropanol, of benzophenone to diphenyl carbinol, of dimesityl ketone to dimesityl carbinol, of steroidal carbonyl groups such as 17-ketosteroids like estrone to an alcohol such as extradiol-17-beta. Further exemplifying reducible carbonyl compounds are the carboxylic acids, and the reduction of acids to carbinols such as the reduction of acetic acid to ethanol, of suberic acid to 1,8-octane diol, of phenylacetic acid to phenylethanol, of 2-furoic acid to furfuryl alcohol, of 2-methylthiophene-3-carboxylic acid to 2-methyl-3-hydroxymethylthiophene and so forth. Conversion of carboxylate esters to alcohols may be accomplished to produce 4-hydroxycinnamyl alcohol from methyl p-acetoxycinnamate, to provide 1,3,5-pentanetriol from ethyl 3-hydroxyglutarate, to provide oleyl alcohol from triolein, and so forth. Further, the reduction of amides to provide substituted amines may be accomplished, as for example by reduction of N-formamidepyrrolidine to 1-methylpyrrolidine, of N-formyl butylamide to N-methylbutylamine, and so forth. Further, in addition to the reduction of carbonyl carbon atoms, other reductions may be accomplished, such as reduction of compounds of elements other than carbon and oxygen, including for example sulfur, phosphorus, nitrogen, silicon and the like, and compounds in which the reduction occurs by displacement of an element or a group other than oxygen such as a halogen substituent.

In employing the presently provided novel complex hydrides as reducing agents, the compound to be reduced may simply be associated with the hydride in a suitable solvent or diluent system, preferably one having solubility for both the hydride and the compound to be reduced, so that a homogeneous reaction system is obtained.

Exemplary of solvents dissolving a phosphonium methylene phosphorane complex hydride of the type provided by this invention with no apparent decomposition are, for example, n-propanol, isopropanol, nitromethane, acetonitrile, dimethylformamide and pyridine. Reaction of a borohydride of the invention even with hydroxylic compounds like methanol and ethanol is extremely slow, so that suitable reaction media can also be provided employing these alkanols. Mixtures of different solvents are also useful. Furthermore, it has been found that homogeneous solutions of the presently provided complex hydrides can be obtained in mixed solvent systems including a minor amount of a polar solvent for the complex hydride, such as the oxygen- and nitrogen-containing solvents mentioned above, and a major amount of a non-polar, non-solvent for the hydride, such as hydrocarbon like alkanes such as hexane or cyclohexane and aryl hydrocarbons like benzene and toluene. For example, a complex hydride insoluble in benzene or hexane dissolves completely in 10:1 benzene-ethanol and 1:1 hexane-ethanol mixtures. Thus homogeneous reaction mixtures are afforded for reduction of organic compounds soluble in either polar or non-polar solvents.

With complex hydrides such as the borohydrides of the invention, four atoms of hydrogen are released for each molecule of the complex hydride utilized, and the ratio of the presently provided hydrides to the reducible compounds to be reduced therewith, for stoichiometric proportions, will be adjusted accordingly. If desired, an excess of the complex hydride reducing agent may be present, or on the other hand, the hydride can, for example, be introduced gradually to the reaction mixture, so that the reducible compound is present in excess throughout at least the major part of the reaction time. Thus, the ratios of the reducible compound and the reducing agent are not generally critical.

Vigorous reduction is observed when a reducible compound is contacted with a phosphonium methylene phosphorane complex hydride at room temperatures, and indeed, the reaction mixture may need to be cooled to moderate the violence of the reaction. Thus, the reduction may be effected at temperatures ranging from just above freezing up to any temperature below the decomposition temperatures of the reaction mixture components. Pressures may also vary, from subatmospheric such as 0.5 mm. Hg up to superatmospheric, such as 5000 pounds per square inch, though atmospheric pressures are usually suitable.

The invention is illustrated but not limited by the following examples.

Example 1

This example illustrates dehydrohalogenation of a methylene bis(triphenylphosphonium bromide) to provide a phosphonium methylene phosphorane bromide.

A mixture of 17.5 grams (g.) (0.025 mole) of methylene bis(triphenylphosphonium bromide) in 400 milliliters (ml.) of dry ethyl ether is stirred under nitrogen at 0° C. while 15 ml. (0.025 mole) of a solution of lithium butyl in hexane is added over a period of 15 minutes, with stirring. After the addition is complete, the stirring is continued for a further two hours. Filtering separates 17 g. of a white solid, which is extracted with a mixture of methylene dichloride and water. The methylene dichloride layer is washed three times, with 300 ml. each time of water, and dried over magnesium sulfate. The dried solution, after filtration, is evaporated to dryness, producing 13 g. of white solid which is triphenylphosphonium methylene triphenylphosphorane bromide.

Example 2

This example illustrates preparation of a complex hydride in accordance with this invention.

A solution of 0.63 gram (0.017 mole) of sodium borohydride in 50 milliliters (ml.) of methanol is stirred while 1.0 g. (0.0017 mole) of triphenylphosphonium methylene triphenylphosphorane bromide is added to the stirred solution. A homogeneous clear solution is formed. The solution is stirred for 10 minutes, during which evolution of bubbles of hydrogen is observed. It is then transferred to an ice bath, stirred, and then 400 ml. of cold water is added to the reaction mixture, producing a white solid precipitate which is separated by filtration and dried in a vacuum (of 15 mm. Hg) at 80° C., providing triphenylphosphonium methylene triphenyl phosphorane borohydride as a white crystalline solid melting (corr.) at 210–211° C. (decomp.).

The assignment of structure is confirmed by the infrared spectrum, which exhibits absorption corresponding to the triphenylphosphonium methylene triphenyl phosphorane mesomeric cation and to the borohydride anion. Elemental analyses (C, H, P, B) are in agreement with the stated structure.

Example 3

This example describes another preparation of a borohydride in accordance with the invention.

The procedure of Example 2 is repeated, by addition of 10.00 g. of triphenylphosphonium methylene triphenylphosphorane bromide to a solution of 6.35 g. of sodium borohydride in 500 ml. methanol. After stirring for 5 minutes, the reaction mixture is turned into 4 liters of water at room temperature, and the resulting precipitate is separated by filtration. After washing with water and drying three hours in vacuum at 70° C., a 92% yield of triphenylphosphonium methylene triphenylphosphorane borohydride is obtained, as white crystals, M. 207–209° (decomp.).

Example 4

This example describes the use of the borohydride prepared as described in the above examples as a reducing agent.

A homogeneous reaction mixture is prepared by combining 5.0 g. of methanol, 0.4 g. (0.0070 mole) of acetone and 1.0 g. of triphenylphosphonium methylene triphenylphosphorane borohydride (0.0018 mole) at room temperature. A vigorous exotherm is observed. The reaction mixture is analyzed by vapor phase chromatographic analysis, which shows that the reaction mixture contains 5.4 area-percent isopropanol. This corresponds to reduction of about 80% of the acetone present.

Example 5

Addition of an aqueous solution of silver nitrate to a methanol solution of triphenylphosphonium methylene triphenylphosphorane borohydride at room temperature similarly produces vigorous bubbling and formation of metallic silver.

Example 6

This example illustrates reduction of another organic compound with a complex hydride of this invention.

A solution of 0.87 gram (0.0066 mole) cinnamaldehyde in 9.1 g. of methanol is added to a freshly prepared stirred solution of 0.91 g. (0.00165 mole) of triphenylphosphonium methylene triphenylphosphorane borohydride at room temperature. Cinnamyl alcohol is produced. The same product is obtained using double the amount of the borohydride. Cinnamyl alcohol is also obtained, in 30% yield, by the room temperature reaction of 0.035 g. of cinnamaldehyde in a solvent mixture of 4.10 g. of benzene and 0.46 g. of ethanol with a solution of 0.455 g. of triphenylphosphonium methylene triphenylphosphorane borohydride in a solvent mixture of 4.5 g. of benzene and 0.50 g. of ethanol.

While the invention has been described with particular reference to various specific preferred embodiments thereof, it is to be appreciated that the modification and variations may be made without departing from the scope of the invention, which is limited only as defined in the appended claims.

What is claimed is:

1. A triphenylphosphonium methylene triphenylphosphorane complex Group III element hydride wherein said triphenylphosphonium methylene triphenylphosphorane radical is of the formula $[(C_6H_5)_3PCHP(C_6H_5)_3]^+$.

2. A triarylphosphonium methylene triarylphosphorane complex Group III element hydride wherein the methylene substituent is selected from the class consisting of hydrogen and hydrocarbon free of aliphatic unsaturation and containing up to 18 carbon atoms, and said aromatic phosphorus substituents are hydrocarbon free of aliphatic unsaturation and containing up to 18 carbon atoms.

3. Triphenylphosphonium methylene triphenylphosphorane borohydride of the formula $$[(C_6H_5)_3PCHP(C_6H_5)_3]^+BH_4^-$$

4. The triarylphosphonium methylene triarylphosphorane borohydrides wherein the methylene substituent is selected from the class consisting of hydrogen and hydrocarbon free of aliphatic unsaturation and containing up to 18 carbon atoms, and said aromatic phosphorus substituents are hydrocarbon free of aliphatic unsaturation and containing up to 18 carbon atoms.

References Cited by the Examiner

Fieser et al.: Organic Chemistry, N.Y., Rheinhold (1956), pages 116–117.

HELEN M. McCARTHY, *Acting Primary Examiner.*
TOBIAS E. LEVOW, *Examiner.*
W. F. W. BELLAMY, *Assistant Examiner.*